United States Patent [19]

Fasano

[11] Patent Number: 4,463,403

[45] Date of Patent: Jul. 31, 1984

[54] PLUG TYPE GAS TUBE REPLACEMENT MODULE

[75] Inventor: Michael Fasano, Syosset, N.Y.

[73] Assignee: Porta Systems Corp., Syosset, N.Y.

[21] Appl. No.: 424,209

[22] Filed: Sep. 27, 1982

[51] Int. Cl.$^3$ .......... H02H 9/06

[52] U.S. Cl. .......... 361/124; 361/119; 337/32; 337/34

[58] Field of Search .......... 361/119, 120, 124, 118, 361/117, 56, 125; 337/15, 28, 29, 32, 33, 34; 313/325, 231.1; 315/36

[56] References Cited

U.S. PATENT DOCUMENTS 2,619,518 11/1952 Kelsay .......... 361/124 X 3,755,715 8/1973 Klayum et al. .......... 361/120

3,852,539 12/1974 DeLuca .......... 361/119 X 4,086,648 4/1978 Hines et al. .......... 361/120 X

*Primary Examiner*—Patrick R. Salce

*Attorney, Agent, or Firm*—Charles E. Temko

[57] ABSTRACT

A replacement type gas tube protector for use with an older type telephone protector block utilizing a bayonet lug type engagement. The original carbon block protection is replaced by a gas tube element of smaller dimension, a conductive washer, and an insulative washer having a conductive sleeve. The conductive washer and gas tube element form a primary air gap means. The conductive washer and the insulative washer form a secondary air gap means.

1 Claim, 4 Drawing Figures

PLUG TYPE GAS TUBE REPLACEMENT MODULE

BACKGROUND OF THE INVENTION

This invention relates generally to the field of telephone protection modules used in a central office for protecting office equipment from excess current surges on individual subscriber pairs, and more particularly to a replacement type protector module adapted for use with certain types of older telephone protector blocks using a generally cylindrically shaped protector module, a typical example being the Western Electric Type 300 block and associated modules.

In this type of block, the module is of cylindrical configuration and engages a bayonet type spring socket somewhat resembling that employed for a small base incandescent lamp. The carbon block element is aligned with the axis of the module, and is resiliently clamped between a pair of peripherally oppositely disposed spring fingers which conduct to one of the carbon blocks. Providing secondary protection, the modules are usually provided with heat sensitive means in the form of a coil which melts a solder pellet to provide for bypassing the air gap using constructions which are well known in the art.

With the continued improvement in quality and availability of gas tube type air gap means, almost all new installations now feature this type of protection. In older constructions, principally due to the lack of availability, replacement modules have been constructed substantially identical to the modules which they replace, e.g. utilizing old type carbon block protection.

SUMMARY OF THE INVENTION

Briefly stated, the invention contemplates the provision of an improved replacement module for older type protector blocks of the class described which affords the previously unavailable advantages of gas tube protection in a module of cylindrically shaped bayonet type, the replacement module being fully interchangeable with the original module. Utilizing the prior art cylindrical cage forming a part of the module, the gas tube is positioned with its axis transverse to the principal axis of the module. Coaxially positioned with respect to the gas tube element is an insulative washer having a conductive sleeve therein forming a secondary air gap means, so that the module offers back-up protection in the event of failure of both the heat sensitive means and the gas tube.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

Figure 1:
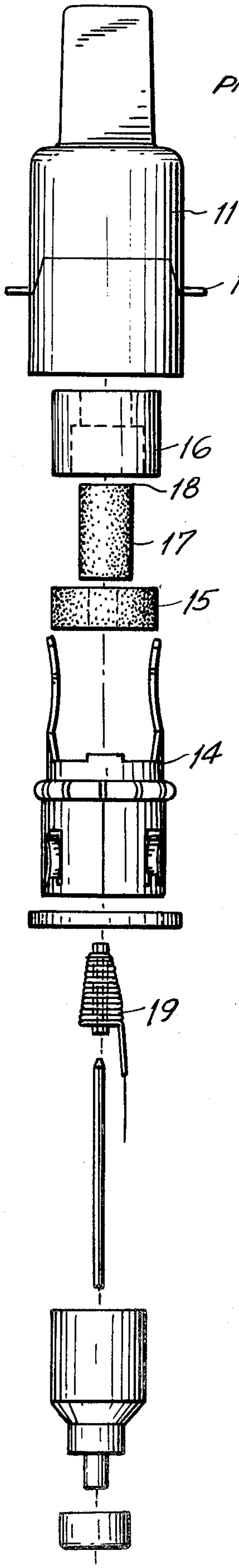
FIG. 1 PRIOR ART
FIG. 1 is an exploded side elevational view of a prior art module replaced by the disclosed embodiment of the invention.

Referring to FIG. 1 in the drawing, there is illustrated a prior art module, generally referred to as Western Electric Type 300. The module includes a hollow housing element 11 provided with bayonet type lugs 12, the ends of which engage corresponding recesses in a Type 300 protector block (not shown). Partially disposed within the housing element 11 is a concentric metallic cage 14 having oppositely disposed spring fingers which electrically communicate with a larger carbon 15 abutting a ceramic sleeve 16 maintaining a smaller carbon 17 in spaced relation to form an air gap, as is known in the art. The smaller carbon 17 includes a projecting tip 18 which communicates with a centrally disposed terminal in a corresponding recess in the block. This type of module is normally provided with heat coil means 19 wound about an axially disposed core.

Figure 2:
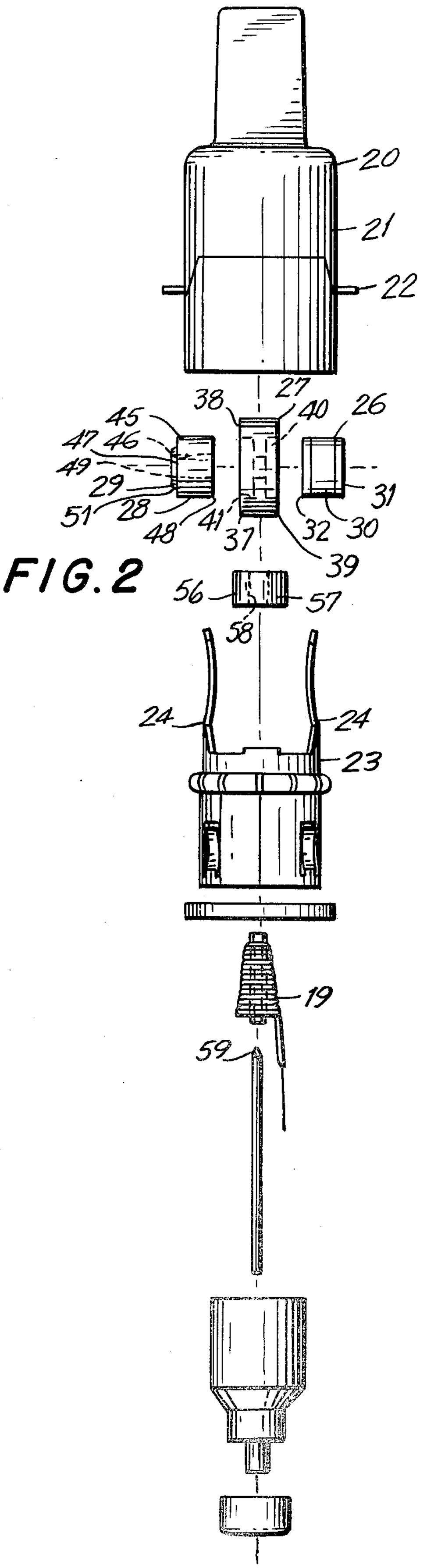
FIG. 2 is a corresponding exploded side elevational view of an embodiment of the invention.
Figure 3:
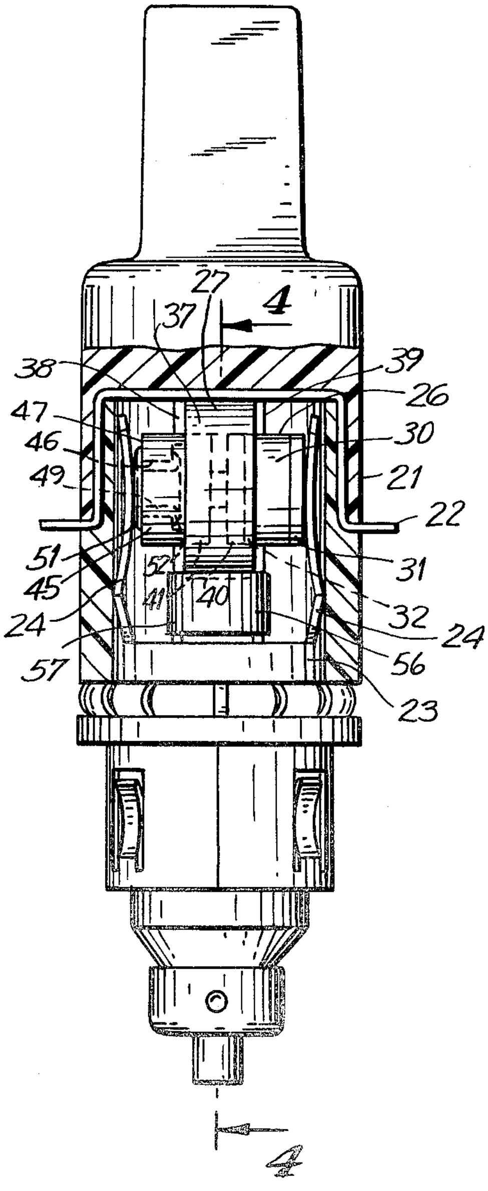
FIG. 3 is an assembled side elevational view of the embodiment.
Figure 4:
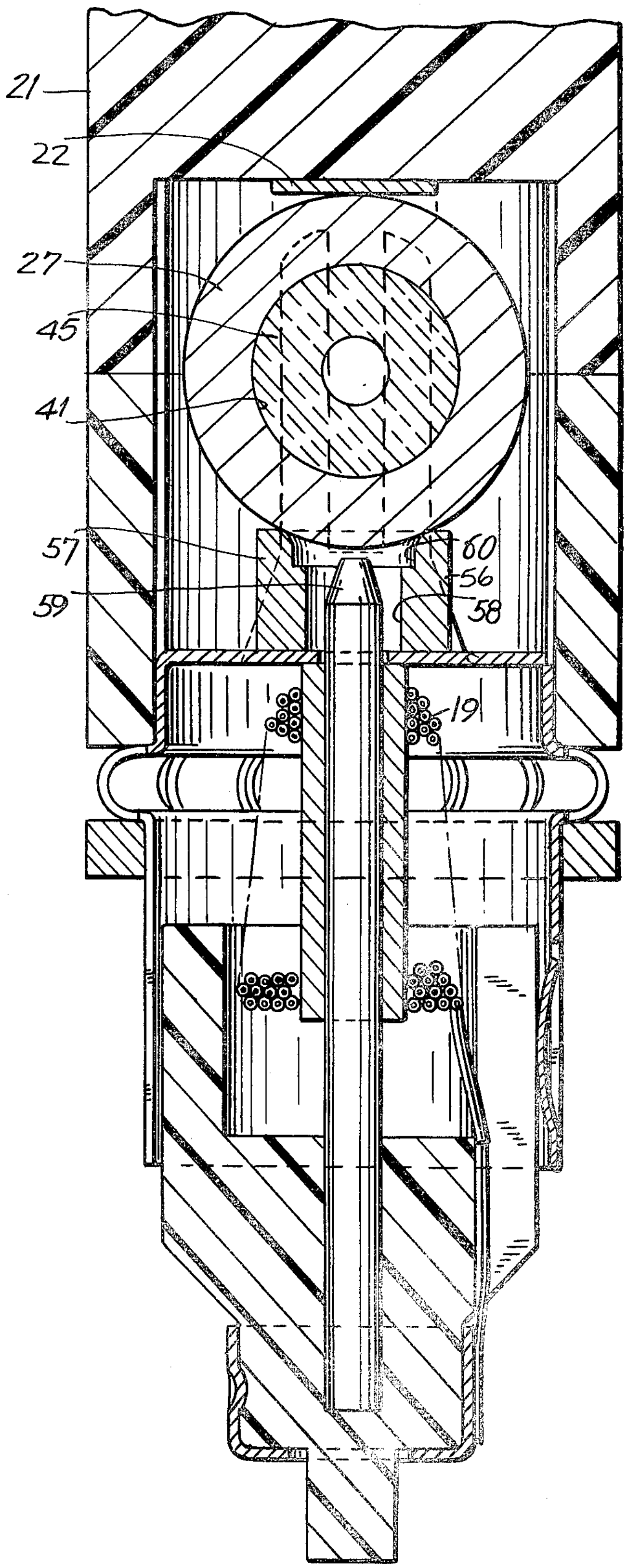
FIG. 4 is an enlarged longitudinal sectional view of certain of the component parts of the embodiment.

Referring to FIG. 2 in the drawing, an embodiment of the invention, generally indicated by reference character 20 includes a similar hollow housing 21 with bayonet engaging means 22, and a concentric cage 23 having conventional spring fingers 24. In lieu of the carbon arc structure 15–18, there are provided a gas tube element 26, a conductive washer 27 and a non-conductive washer 28 having a concentrically disposed conductive sleeve 29 which forms a secondary air gap means.

The gas tube 26 is of conventional construction, and is bounded by a cylindrical surface 30 and first and second conductive end terminals 31 and 32.

The conductive washer 27 may be die cast of conductive metal, or formed from brass or similar material as a screw machine product. It includes an outer cylindrical surface 37 and first and second end surfaces 38 and 39. Extending inwardly from the surfaces 38 and 39 are first and second recesses 40 and 41, the former partially enclosing one of the conductive ends 31–32 of the gas tube element 26, and the second recess 42 engaging an end of the non-conductive washer 28.

The non-conductive washer includes a ceramic main body 45 having an axially disposed bore 46 communicating between first and second end surfaces 47 and 48. Disposed within the bore 46 is a conductive sleeve 49 of grommet-like configuration, including a longitudinally disposed portion 50 one end of which is provided with a radially disposed flange 51. The flange 51 in assembled condition is disposed within the end recess 41. The opposite end 52 of the sleeve 49 terminates a short distance from the second end surface 48 of the body 45 to form a secondary air gap.

An axially disposed positioning washer 56 includes a cylindrical surface 57 and a centrally disposed bore 58 surrounding a projecting tip 59 forming a part of the heat coil means 19. A recess 60 serves a supporting and centering function by engaging a portion of the cylindrical surface of the conductive washer 27.

In assembled condition, the gas tube element 26, conductive washer 27 and non-conductive washer 28 are positioned with the principal axis of each at right angles with respect to the principal axis of the housing 21 so as to be fitted between the spring fingers 24. In this position, when the assembled device 20 is inserted in a corresponding recess in the protector block, the cylindrical surface of the conductive washer 27 will contact a centrally disposed terminal in the block (not shown), and thus establish two separate selectively conductive paths. One path leads through the gas tube to one of the spring fingers 24, and the other through the conductive washer and the sleeve 49 of the non-conductive washer 28. The heat coil means 19 is undisturbed, and functions in a conventional manner. Thus, during operation, a relatively momentary surge will arc through the gas tube element and be conducted to ground. Should it fail, the secondary air gap means provided by the conductive sleeve 49 and the opposite spring finger 24 will serve a similar function. Should the excess current surge be of a sustained nature, heat generated within the gas tube or the secondary arc will activate the heat coil means 19 and melt a conventonal solder pellet in normal fashion, to effect a grounding connection bypassing both the gas tube and the secondary air gap means.

It will be observed that only the known carbon blocks of the known module are replaced by the present invention, and the replacement provides not only the advantages of a gas tube, but an additional secondary air gap means in the event of failure of the gas tube. The replaced parts are relatively simple to manufacture, and only three in number, thus permitting the replacement module to be manufactured at a cost directly comparable to the cost of manufacture of the module which it replaces.

I wish it to be understood that I do not consider the invention limited to the precise details of structure shown and set forth in this specification, for obvious modifications will occur to those skilled in the art to which the invention pertains.

I claim:

1. In a telephone protector module of a type including a generally cylindrical body having a principal axis, and a coaxially disposed conductive metallic cage having a pair of resilient oppositely disposed fingers supporting an air gap means, improved air gap forming means comprising: a gas tube element having first and second conductive end surfaces, a conductive washer having a peripheral surface, first and second end surfaces, said first end surface having means for engaging an end surface of said gas tube element, an insulative washer having first and second ends, a through bore communicating with said ends, and a conductive sleeve disposed within said bore, a first end of said sleeve overlying said first end of said insulative washer, and contacting said second end of said conductive washer, a second end of said sleeve being positioned inwardly of said second end of said insulative washer; said gas tube element, conductive washer and insulative washer being positioned coaxially with respect to each other, and transversely with respect to said principal axis of said cylindrical body between said spring fingers; said peripheral surface of said conductive washer contacting a terminal communicating with an engaged protector block, said gas tube element forming a primary air gap means with one of said spring fingers, said insulative washer and sleeve forming a secondary air gap means with the other of said spring fingers.

* * * * *